United States Patent [19]

Lorsch

[11] 4,367,619

[45] Jan. 11, 1983

[54] DEVICE FOR STACKING SLIDE FRAMES INTO A CONTAINER

[76] Inventor: Johannes Lorsch, An der Bleiche 49, D-4172 Straelen, Fed. Rep. of Germany

[21] Appl. No.: 177,444

[22] Filed: Aug. 8, 1980

[30] Foreign Application Priority Data

Aug. 9, 1979 [DE] Fed. Rep. of Germany ....... 2932286

[51] Int. Cl.$^3$ ............................................... B65B 5/10
[52] U.S. Cl. ..................................................... 53/245
[58] Field of Search ................. 53/244, 245, 258, 535, 53/538, 540

[56] References Cited

U.S. PATENT DOCUMENTS

| | | | |
|---|---|---|---|
| 1,431,399 | 10/1922 | Hill | 53/244 |
| 3,041,804 | 7/1962 | Eichorn et al. | 53/535 X |
| 4,139,980 | 2/1979 | Larson et al. | 53/244 X |
| 4,144,694 | 3/1979 | Stapp et al. | 53/245 X |
| 4,159,761 | 7/1979 | Egee et al. | 53/540 X |
| 4,161,095 | 7/1979 | Buday | 53/244 X |

*Primary Examiner*—Horace M. Culver
*Attorney, Agent, or Firm*—Lowe, King, Price and Becker

[57] ABSTRACT

Apparatus for stacking flat-shaped articles such as slide frames including article conveyor means. A container is adapted for receiving successive articles from the conveyor. The container is mounted in a receiver with height control means for the position of the container in the receiver, a pusher member extends into the container and is selectively vertically movable to depress the container and articles therein by downward contacting movement on articles stacked therein, and to an elevated position to permit succeeding articles to be deposited from the conveyor means onto the stack of articles in the container. Accelerating means serve to eject successive articles from the conveyor means into the container. A stopper is provided to limit downward movement of the container in the receiver. The stopper is pivotally mounted to permit removal of a filled container from the receiver.

7 Claims, 3 Drawing Figures

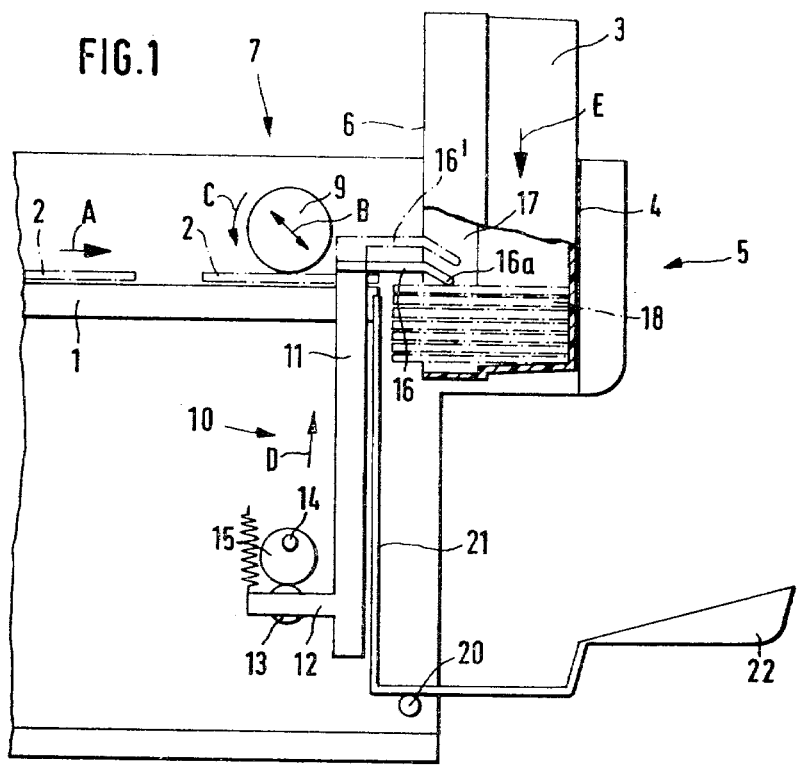

DEVICE FOR STACKING SLIDE FRAMES INTO A CONTAINER

TECHNICAL FIELD

The invention relates to a device for stacking flat-shaped articles, especially such as slide frames, moved consecutively along a conveyor means, into a container which can be inserted into a receiving means therefor.

BACKGROUND ART

Devices are known for the stacking of slides, that have been framed in a framing machine, into carrier containers. The containers are used, for example, by wrapping a number of slides that are to be sent by mail. The known devices however were satisfactory only if the slides are moved forward at a constant speed and if, in addition, the frames are of a uniform thickness.

The present invention is directed to the concept of a device of the foregoing type which is adapted to varying transport speeds and thicknesses of the slide frames and the like.

DISCLOSURE OF INVENTION

According to the invention, this result is accomplished by the disclosed apparatus. The container, through the effect of a hold-back mechanism, is held in its respective position in the receiving means transversely to the level of the slide frames brought forward on the conveyor. A lifting mechanism operating a pusher member is provided that works rhythmically and is adapted to the transport means, with a lifting force that exceeds the braking effect of the hold-back mechanism. The pusher member is operable to reach into the stack-receiving area of the inserted container, and has a limit of movement that is in the direction of motion of the container. Reversal points of movement are located on opposite sides of that area of the receiving device, or of the container, which coacts with the conveyor in the transport direction of the slide frames.

After stacking of the individual slide frames, the pusher, in each case, presses down on the stack building up in the container, and moves the container such a distance that, when the next slide frame is brought forward, the preceding slide frame is no longer in the path of movement of the slide frames. In this manner, interference due to varying thicknesses of the slide frames on the stacking process is eliminated.

In another aspect of the invention, the conveyor has an accelerating means for transporting the slide frames beyond the end of the conveyor path into the container. This accelerating means is linked to the end of the conveyor by means of flights on a moving chain. The accelerating means is preferably an accelerating roll, the distance of which to the transport direction can be adjusted from the conveyor. By this means, the slide frames, at the end of the conveyor path, are pulled away from the respective flight of the chain and, in an accelerated manner, are forwarded into the container.

In a further aspect of the invention, the receiving means has a vertically directed receiving shaft, into which a container to be filled can be inserted from above, and which, after filling, can be removed from the receiving shaft from the bottom.

Another feature of the invention is provision of a stopper for the container which is linked to the lower end of the receiving shaft, and which can be swivelled. This stopper makes it possible for a filled container to be removed conveniently.

A refinement of the invention includes the structure wherein the hold-back mechanism is a spring unit laterally mounted in the receiving means.

The lifting mechanism for the pusher member preferably includes a cam system that acts against the force of a tension spring, the movement of the cam system being coupled with movement of the accelerating roll. The height of lift of the pusher member is preferably adjustable.

A preferred embodiment of the invention is disclosed in detail in the accompanying drawings.

BRIEF DESCRIPTION OF DRAWINGS

FIG. 1 is a fragmentary schematic elevational view of an embodiment of the invention, partly in section;

FIG. 2 is a fragmentary plan view of the apparatus of FIG. 1; and

BEST MODE FOR CARRYING OUT THE INVENTION

Figure 3:
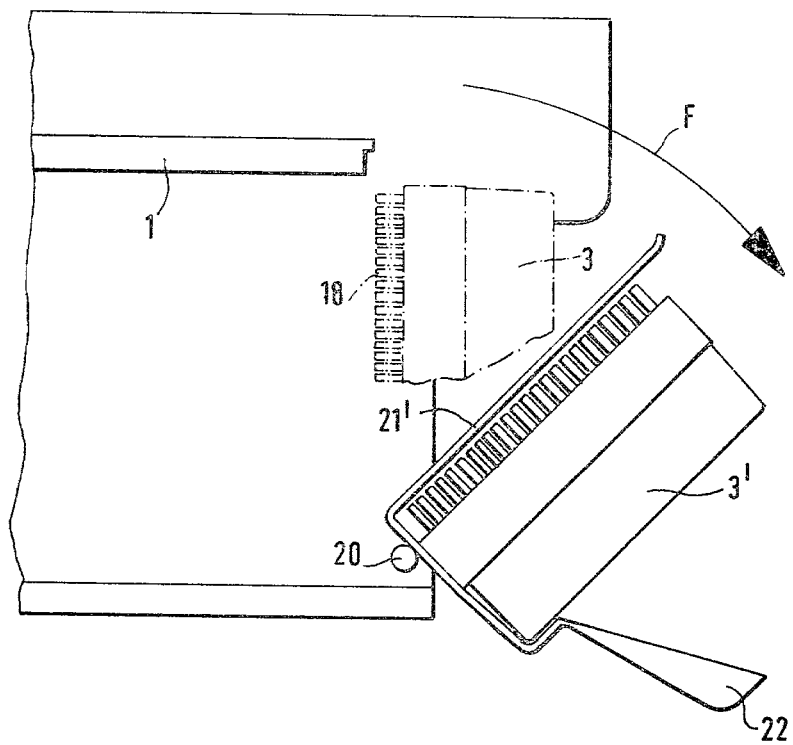
FIG. 3 is a schematic view of the stopper for the container in swivelled position.

A conveyor means 1, FIG. 1, has a chain belt (not shown) with engaging flights by means of which flat-shaped articles 2, such as slide frames, are moved forward consecutively as shown by arrow A. The device of the invention stacks the slide frames 2 into a container 3. The container 3 is inserted from above into a vertical receiving shaft 4 of a receiving means, generally designated 5. The container 3 is held in receiving shaft 4 in the proper position by means of a hold-back mechanism (not shown), which can, for example, consist of a laterally arranged, spring-loaded ball bearing that presses against a wall of the container 3 to positionally hold it. To remove the container 3, the hold-back mechanism can be detached toward the bottom. The container 3 has an opening 6, through which the slide frames 2 can be stacked. At the end of the conveyor 1, an accelerating means, generally indicated 7, is provided, and has an accelerating roll 9 that can be driven by a driving device 8. The accelerating roll 9 is so mounted that it can be adjusted in the directions of arrow B, and turns in the direction indicated by arrow C. By means of the accelerating roll 9, a slide frame 2, which has moved to a position below the accelerating roll, is accelerated, thus being separated from the engaging flight (not shown) and, as shown in FIG. 1, is moved to the right and into container 3.

A lifting mechanism, generally indicated as 10, has a vertical part 11 which, through a tension spring 10a is under initial tension in the direction of arrow D, i.e., in upward direction. A roll 13 is mounted on a horizontal arm 12. This roll 13 is in contact with a cam 15 that can be rotated about an axis 14. By means of this cam 15, the lifting mechanism 10 can be moved downward opposite the dorection of the arrow D, FIG. 1 showing the lower reversal point. When the cam 15 is rotated further, the lifting mechanism moves upward in the direction of the arrow D. The movement of the cam 15 is coupled with movement of the accelerating roll 9. At its upper end, the lifting mechanism 10 has a pusher member 16 with a bent front end 16a, which reaches into the stack receiving area 17 of the container. In the shown lower reversal position of the lifting mechanism, the bent front end has a height or position corresponding to the height of the conveyor path.

The device operates as follows: A slide frame 2 is transported into the container 3 by means of the accelerating roll 9, when the pusher member 16 is in the broken line position 16', thus above that position which is crossed by a slide frame during stacking into the container 3. When the slide frame 2 lies on the stack 18 in the container, the pusher member 16 is moved downward opposite the direction of arrow D through lowering movement of the lifting mechanism 10. The bent end 16a then presses the stack and the container 3 downward in the direction of arrow E, by an adjustable distance determined by operation of the cam 15. The adjustment can operate in such a way that the stack and thus the container is pressed downward a distance such that the slide frame that was last stacked into the container is below the path of a succeeding slide frame in the stacking process. In this manner, varying thicknesses of the slide frames can be compensated. For the function of engaging the pusher member 16, the container 3 has recesses 19 at its upper and lower front ends. A stopper 21, having a handle 22 is located below the container and can be swivelled around an axis 20. After the container 3 is filled, it is, as shown in FIG. 3, through swivelling of the stopper 21 around the axis 20 in the direction of the arrow F (FIG. 3), swivelled into position 21', where the container 3', in this position, can readily and easily be removed, and without slide frames in the container falling out.

While the drawings and description are specific to stacking of slide frames, obviously the apparatus is useful for stacking of other flat-shaped articles. The disclosure and claims are to be interpreted with this understanding.

In this disclosure, there is shown and described only a preferred embodiment of the invention, but it is to be understood that the invention is capable of changes or modifications within the scope of the inventive concept as expressed herein.

I claim:

1. A device for stacking flat slide frames and the like into a container, comprising conveyor means for conveying the frames consecutively into the container inserted in a receiver; means operatively positioned to maintain a selected vertical container position in said receiver corresponding to the elevational position of slide frames moving along said conveyor; a lifting mechanism timed synchronously with said conveyor to produce a pressing force that exceeds a braking force of said container position means for maintaining stacked slides below the elevational position of the conveyor means, a pusher extendable into a stack receiving area of said container and being vertically movable a predetermined height in the plane of moement of said containers to exert the pressing force, said pusher having movement reversal points located on opposite sides of an area of said receiver and said container which operatively coact with the said conveyor in the direction of movement of said slide frames; and means for accelerating slide frames into the container, including an accelerating roll operatively positioned above the conveyor path, said accelerating roll being adjustable relative to the conveyor path to contact and accelerate slide frames and the like of varying thicknesses.

2. A device according to claim 1, wherein said accelerating roll is drivable separately from a drive for the chain.

3. A device according to claim 1, said receiver having a vertically arranged receiving shaft for receiving said container to be filled, said container being removable from a receiving shaft bottom after filling.

4. A device according to claim 3, characterized in that a stopper for the container is provided and coactable with the lower end of said receiving shaft, said stopper being swivelly mounted.

5. A device according to claim 1, said lifting mechanism including a cam system and a receiving tension spring operatively coacting with the cam system to bias the pusher upwardly from the conveyor path, movement of said cam being coupled with movement of said accelerating means.

6. A device according to claim 1, including means for adjusting the height of lift of the pusher.

7. A device for stacking slide frames and the like into a container receiving said slide frames, comprising receiving means for said container, conveyor means for successively moving said slide frames along a path into said container, positioning means for maintaining said container in said receiving means at a predetermined height to receive slide frames from said conveyor, a pusher member extending into said container, cam means for successively moving said pusher to elevated and depressed positions in sequence with movement of slide frames along said conveyor, said pusher contacting stacked slides in the depressed position and being spaced above stacked slide frames in the elevated position, said pusher being operable in the depressed position to downwardly move said container and space slide frames in the container below said conveyor path to enable successive in-line slide frames to be received in the container, said pusher member in the elevated position permitting passage of a succeeding slide frame from said conveyor into said container.

* * * * *